United States Patent [19]

Friesen

[11] Patent Number: 6,082,467
[45] Date of Patent: Jul. 4, 2000

[54] TOOL BAR

[76] Inventor: Milford E. Friesen, One S. Douglas Rd., Douglas, Nebr. 68344

[21] Appl. No.: 09/203,655

[22] Filed: Dec. 2, 1998

[51] Int. Cl.[7] .................................................. A01B 23/00
[52] U.S. Cl. .............................. 172/630; 172/311; 111/57
[58] Field of Search ..................... 172/459, 310, 172/456, 630, 632, 633, 662, 776, 311; 111/57, 62

[56] References Cited

U.S. PATENT DOCUMENTS

| | | | |
|---|---|---|---|
| 4,058,170 | 11/1977 | Ankenman et al. | 172/311 |
| 4,504,076 | 3/1985 | Bedney | 280/411 A |
| 4,582,143 | 4/1986 | Pratt | 172/311 |
| 4,607,708 | 8/1986 | Landphair et al. | 172/776 |
| 4,646,851 | 3/1987 | Duello | 172/776 |
| 4,664,202 | 5/1987 | Applequist et al. | 172/311 |
| 4,721,167 | 1/1988 | Salley et al. | 172/311 |
| 4,723,787 | 2/1988 | Hadley et al. | 172/311 |
| 4,825,958 | 5/1989 | Kelderman | 172/776 |
| 5,232,054 | 8/1993 | Van Blaricon et al. | 172/311 |
| 5,787,988 | 8/1998 | Harlan et al. | 172/311 |

*Primary Examiner*—Thomas B. Will
*Assistant Examiner*—Nathan Mammen
*Attorney, Agent, or Firm*—Zarley, McKee, Thomte, Voorhees & Sease; Dennis L. Thomte

[57] ABSTRACT

A tool bar comprising an elongated tongue having a forward end rotatably secured to the hitch of a tractor and having first and second horizontally disposed pivot pins secured to the rearward end thereof at the opposite sides thereof. The inner end of a first elongated tool bar section is pivotally secured to the first pivot pin and a second elongated tool bar section is pivotally secured to the second pivot pin. The pivotal connection between the tool bar sections and the rearward end of the tongue permits the tool bar sections to flex upwardly and downwardly. The construction of the pivotal connection between the tool bar sections and the tongue is such that a flex-row averaging phenomenon occurs to prevent engagement of the gauge wheels of row planter units mounted at the center of the tool bar when the tool bar sections are flexed downwardly with respect to one another and which prevents engagement of the seed boxes on the row planter units located at the center of the tool bar when the tool bar sections are flexed upwardly with respect to one another.

6 Claims, 6 Drawing Sheets

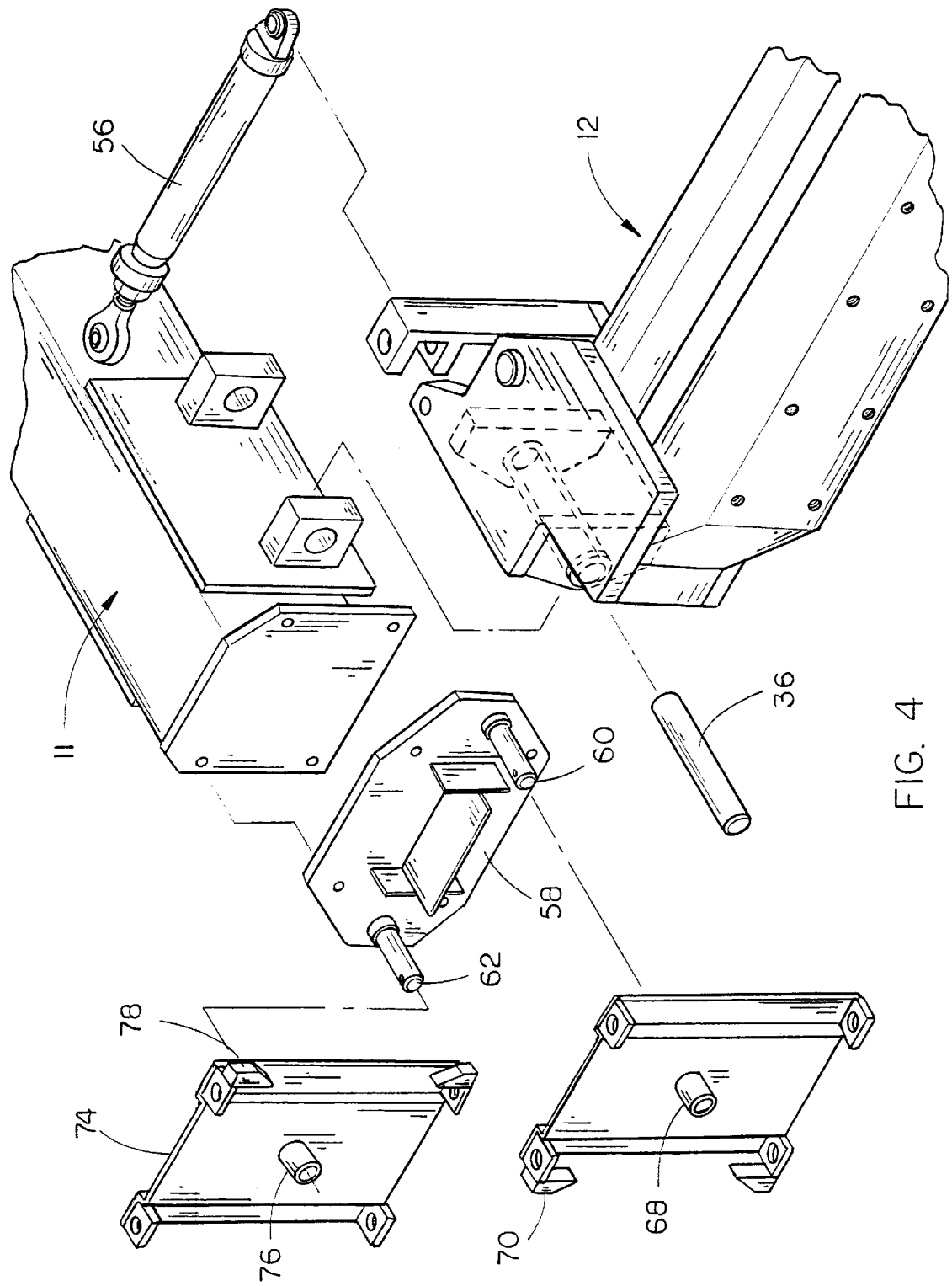

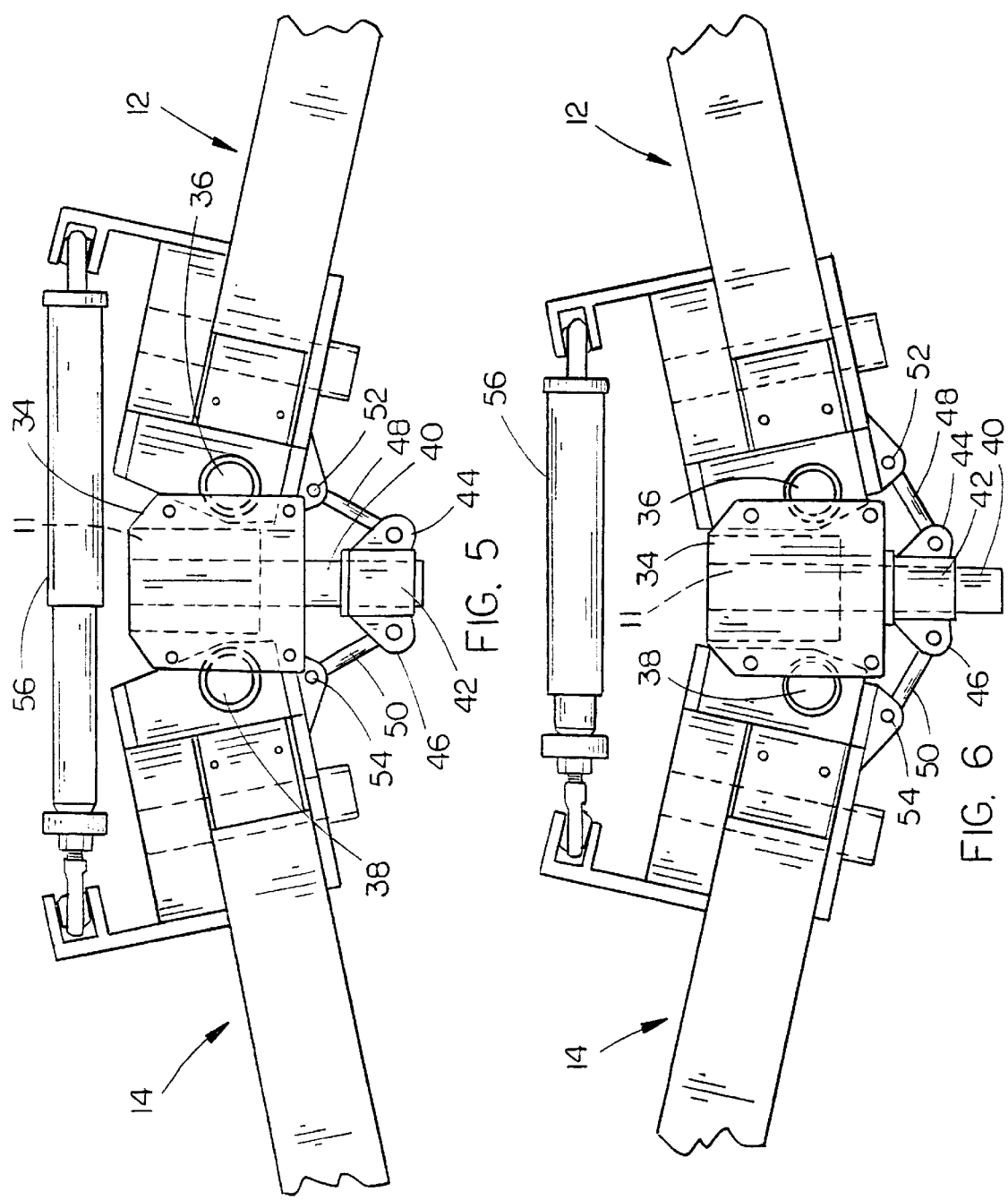

TOOL BAR

BACKGROUND OF THE INVENTION

1. Field of the Invention

This invention relates to a tool bar for use with agricultural implements and more particularly to a tool bar including first and second tool bar sections which may pivotally move upwardly and downwardly with respect to a tongue secured to the tool bar so as to provide a flex-row averaging system.

2. Description of the Related Art

Many types of tool bars have been previously provided for supporting agricultural implements thereon such as planter units, cultivator units, etc. In some cases, the tool bar comprises an elongated tool bar member which is transversely disposed with respect to a forwardly extending tongue which is secured to the tractor. Inasmuch as the current tool bars may be very long, it has been found necessary to provide fold joints in the tool bars so that the opposite ends of the tool bar may be folded inwardly with respect to the tongue so that the implement may be transported from one field location to another field location. Further, when tool bars of considerable length are employed, it is necessary to provide some sort of hinge or joint in the tool bar to permit the opposite ends of the tool bar to move upwardly and downwardly to conform to irregular terrain over which the implement is being moved, such as when the field has terraces. For example, U.S. Pat. No. 4,504,076 discloses a forward-folding agricultural implement which allegedly enables narrow row spacing of planter units mounted on the tool bar. However, due to the fact that the implement of U.S. Pat. No. 4,504,076 includes a rearwardly extending frame member which has a wheeled carriage or truck mounted thereon behind the transversely extending tool bar, it is impossible to closely space the two innermost planter units to accommodate extremely narrow row spacing such as 15-inch rows.

U.S. Pat. No. 4,582,143 also discloses a forwardly-folding agricultural implement, but that implement also includes a rearwardly extending draw bar or frame member, positioned rearwardly of the transversely extending tool bar, which has wheels mounted at the rearward end thereof. The device of U.S. Pat. No. 4,582,143 is believed to suffer the same shortcomings as U.S. Pat. No. 4,504,076.

Thus, it is extremely important to provide a hinge arrangement at the center of the tool bar which permits the attachment of implements thereto, such as planter units, in extremely narrow row spacing such as 15-inch spacing. If a single horizontally disposed hinge pin is provided between the outer wing sections, and the planter units are secured to the tool bar closely adjacent the hinge pin, upward flexing of the wing sections could cause the seed boxes on the innermost planter units on the wing sections to come into contact with one another and damage the same, and downward flexing of the wing sections could cause the gauge wheels on the innermost planter units on the wing sections to come into contact with one another and damage the same. It is for those reasons that the instant hinge joint is disclosed for use in a tool bar which not only permits narrow row spacing of implements on the tool bar such as 15-inch spacing, but which includes means for preventing damage to the innermost planter units or implements when the wing sections of the tool bar are moved upwardly or downwardly with respect to the forwardly extending tongue of the implement.

SUMMARY OF THE INVENTION

A tool bar for an agricultural implement is disclosed including an elongated tongue having forward and rearward ends with the tongue having a top wall, a bottom wall, and opposite side walls. The forward end of the tongue has a hitch member provided thereon for connection to a tractor or the like. The tongue is rotatably connected, about a horizontal axis of the tongue, to the hitch member. A vertically disposed plate is secured to the rearward end of the tongue with the plate having side portions which extend outwardly from the opposite side walls of the tongue. A first pivot pin is secured to one of the side portions of the plate and a second pivot pin is secured to the other of the side portions of the plate. Each of the first and second pivot pins has its longitudinal axis disposed parallel to the longitudinal axis of the tongue. A first elongated tool bar section has its inner end pivotally secured to the first pivot pin whereby the first tool bar section may pivotally move upwardly and downwardly with respect to the tongue. A second elongated tool bar section has its inner end pivotally secured to the second pivot pin so that the second tool bar section may pivotally move upwardly and downwardly with respect to the tongue. The tool bar sections extend transversely outwardly from opposite sides of the tongue when in a field working condition, but portions of the toolbar sections may be folded forwardly to reduce the overall width of the tool bar for transport purposes. A pivot limiting means is also provided for limiting the amount of pivotal movement between the first and second tool bar sections. Agricultural implements such as planter units may be secured to the tool bar sections with the innermost planter unit on each of the tool bar sections being positioned closely adjacent the pivot pins. Further, one of the planter units may be mounted on the vertically disposed plate at the rearward end of the tongue if it is desired to have a 23-row unit spaced 15 inches apart on a 30-foot tool bar. The utilization of a pair of spaced-apart pivot pins enables the tool bar sections to be moved upwardly and downwardly in a greater amount, without damage to the innermost planter units, than would be possible if only a single pivot pin interconnected the inner ends of the tool bar sections due to the flex-row averaging feature of the invention.

It is therefore a principal object of the invention to provide an improved tool bar.

Another object of the invention is to provide a tool bar including a rearwardly extending tongue having a vertically disposed plate secured to the rearward end with tool bar sections being pivotally secured to opposite sides of the plate.

Yet another object of the invention is to provide a tool bar of the type described which enables the close positioning of planter units or the like thereon to accommodate narrow row spacing such as 15-inch rows.

Still another object of the invention is to provide a unique means for pivotally connecting tool bar sections to the rearward end of a tongue so that the implements on the tool bar do not come into contact with one another during flexing of the tool bar sections.

Yet another object of the invention is to provide a tool bar which is economical of manufacture, durable in use and refined in appearance.

These and other objects will be obvious to those skilled in the art.

BRIEF DESCRIPTION OF THE DRAWINGS

FIG. 4 is an exploded perspective view of a portion of the tool bar;

FIG. 5 is a partial rear elevational view illustrating the tool bar sections of the tool bar being flexed downwardly;

FIG. 6 is a view similar to FIG. 5 except that the tool bar sections are being flexed upwardly;

DESCRIPTION OF THE PREFERRED EMBODIMENT

The numeral 10 refers generally to the center-flex tool bar of this invention which provides a flex-row averaging system to enable the tool bar to have planter row units positioned thereon in an ultra-narrow fashion for fifteen-inch rows. Tool bar 10 includes a forwardly extending tongue 11 having means at the forward end thereof to rotatably connect the tongue 11, about a horizontal axis of the tongue 11, to a tractor hitch in conventional fashion.

Figure 1:
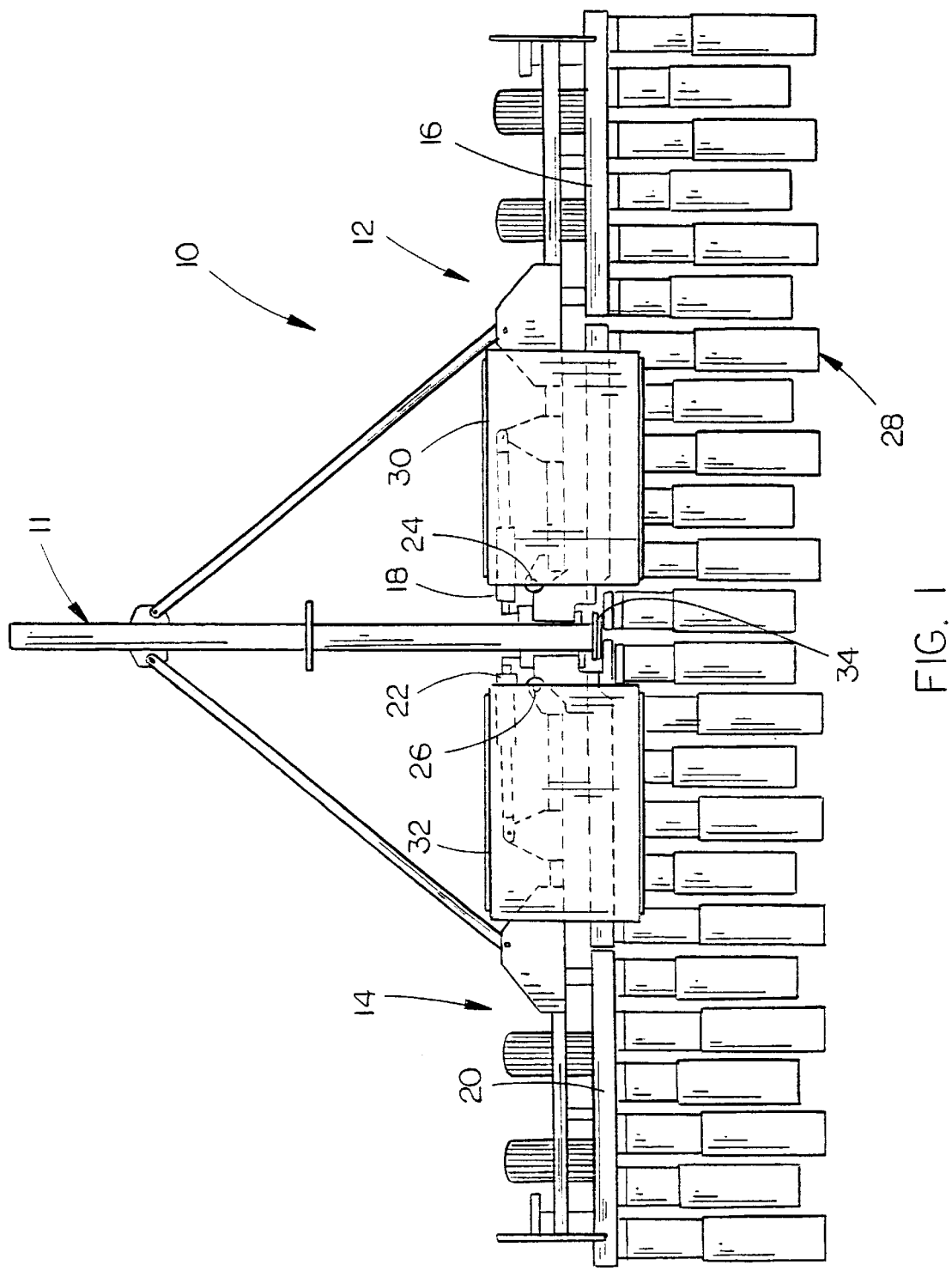
FIG. 1 is a top elevational view of the tool bar of this invention.
Figure 2:
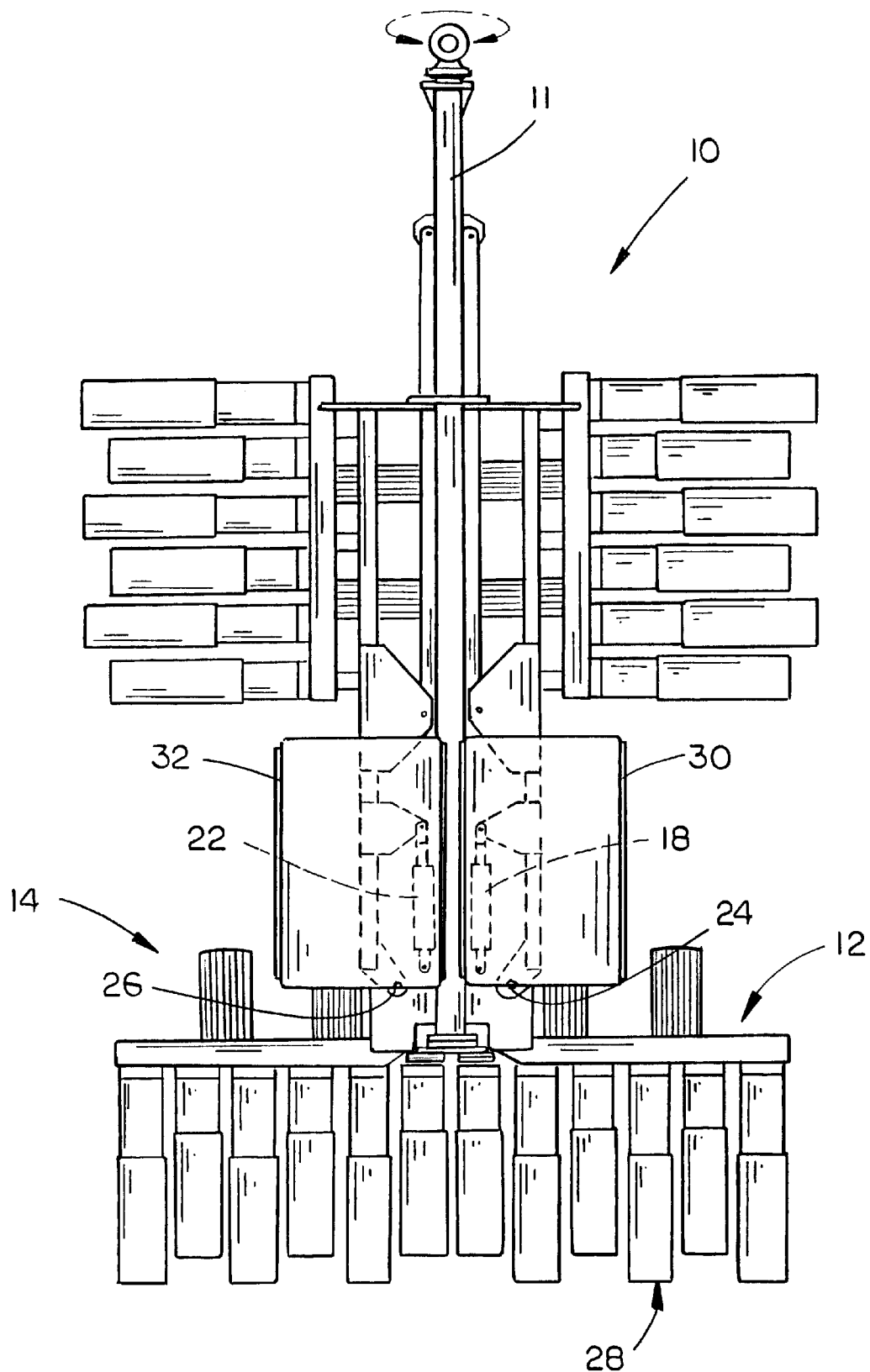
FIG. 2 is a view similar to FIG. 1 except that the tool bar has been moved to a folded position for transport.

As will be described in greater detail hereinafter, tool bar sections 12 and 14 are pivotally connected to the rearward end of the tongue member 11. Tool bar section 12 includes a wing section 16 which may be pivotally folded forwardly from the position of FIG. 1 to the position of FIG. 2 by means of the hydraulic cylinder 18. Similarly, tool bar section 14 includes a wing section 20 which may be folded forwardly from the position of FIG. 1 to the position of FIG. 2 by the hydraulic cylinder 22. The wing sections 16 and 20 are pivotally movable about the vertically disposed pivots 24 and 26, respectively. A plurality of planter row units 28 are mounted on the tool bar sections 12 and 14 by conventional means, but in a much narrower fashion, without damage to the planter units, than is believed to be possible in the prior art tool bars. A pair of fertilizer hoppers 30 and 32 are mounted on the tool bar sections 12 and 14 in conventional fashion.

Referring to FIGS. 5 and 6, it can be seen that the rearward end of the tongue 11 has a plate 34 secured thereto by welding or the like. The inner ends of the tool bar sections 12 and 14 are operatively pivotally secured to the opposite sides of the plate 34 by means of pivot pins 36 and 38, respectively. A shaft 40 is secured to tongue 11 and extends downwardly therefrom for slidably supporting a collar 42. Collar 42 is provided with a pair of ears 44 and 46 at the opposite sides thereof having links 48 and 50 pivotally secured thereto, as illustrated in FIGS. 5 and 6. The upper ends of the links 48 and 50 are pivotally connected to the inner lower ends of the tool bar sections 12 and 14 at 52 and 54, respectively. The purpose of the sliding collar 42 on the shaft 40 extending downwardly from tongue 11 is to keep the tongue 11 centered with respect to the inner ends of the tool bar sections 12 and 14 so that fertilizer tanks, seed hoppers, etc., supported by the tongue 11 above the tongue 11 will remain generally horizontal when the tool bar is flexed upwardly and downwardly. In FIGS. 5 and 6, the numeral 56 refers to a spring-loaded fold stop link operatively connected to the inner ends of the tool bar sections 12 and 14 to limit the flexing or folding of the tool bar sections 12 and 14 in the downward position, as illustrated in FIG. 5, and the upward position, as illustrated in FIG. 6.

Figure 3:
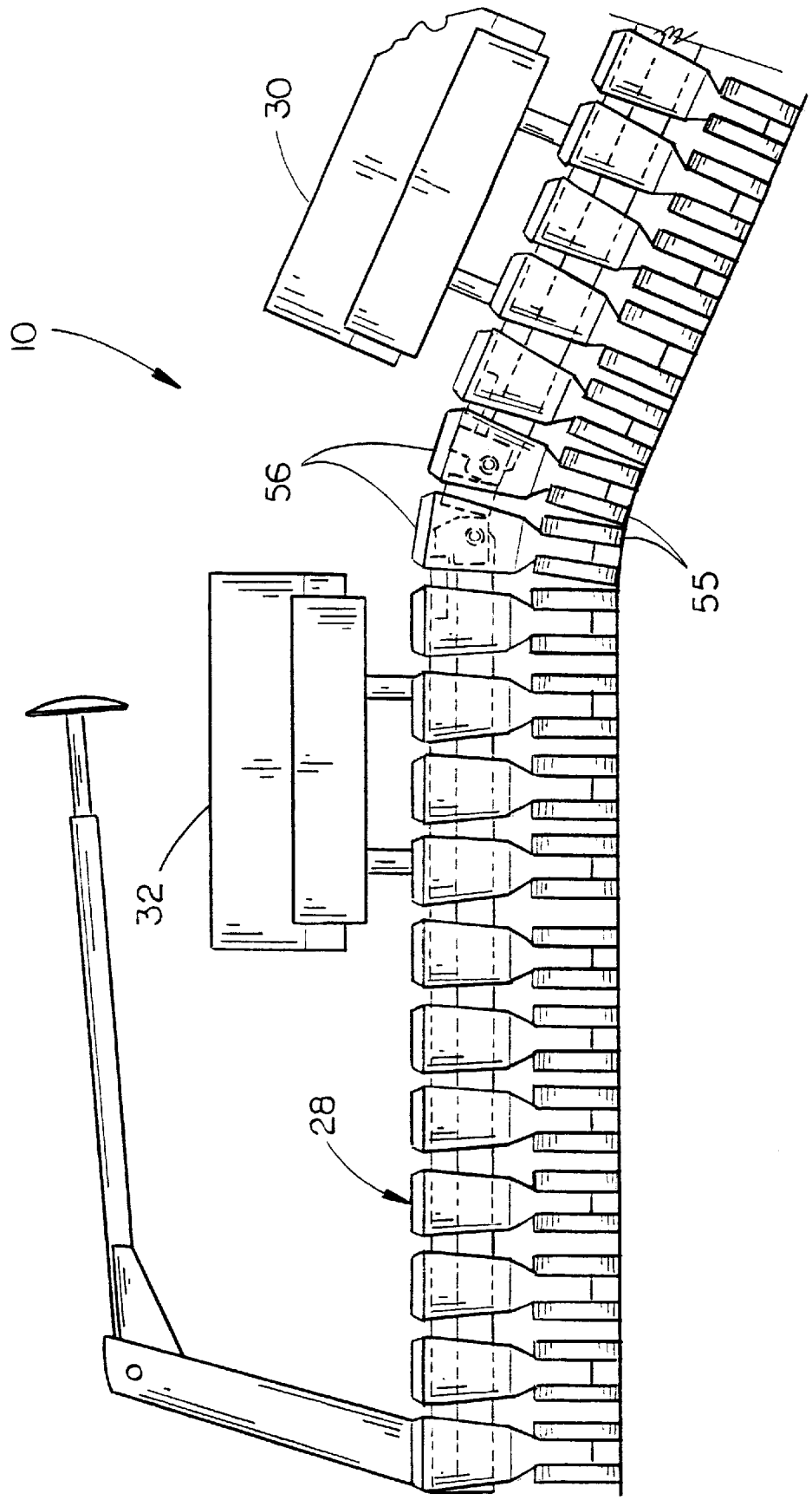
FIG. 3 is a partial rear elevational view illustrating the tool bar being flexed.

The double-flex pivotal connection of the tool bar sections 12 and 14, as illustrated in FIGS. 5 and 6, provides what is termed by the inventor herein as a flex-row averaging system designed to positively prevent interference between the row unit depth gauge wheels 55 on the innermost planter units when crowning a terrace at a full twenty-four degrees of down-flex, as illustrated in FIG. 3, and also to prevent damage to the seed boxes 56 on the planter units 28 at a full twenty-four degrees of up-flex. The flex-row averaging system of this invention keeps the tool bar tongue 11 at an angle of tilt, halfway between the angle of tilt of the wings. Thus, when the tool bar sections 12 and 14 are flexed at twenty-four degrees, the plate 34 and the row unit secured thereto is only tilted twelve degrees.

Figure 7:
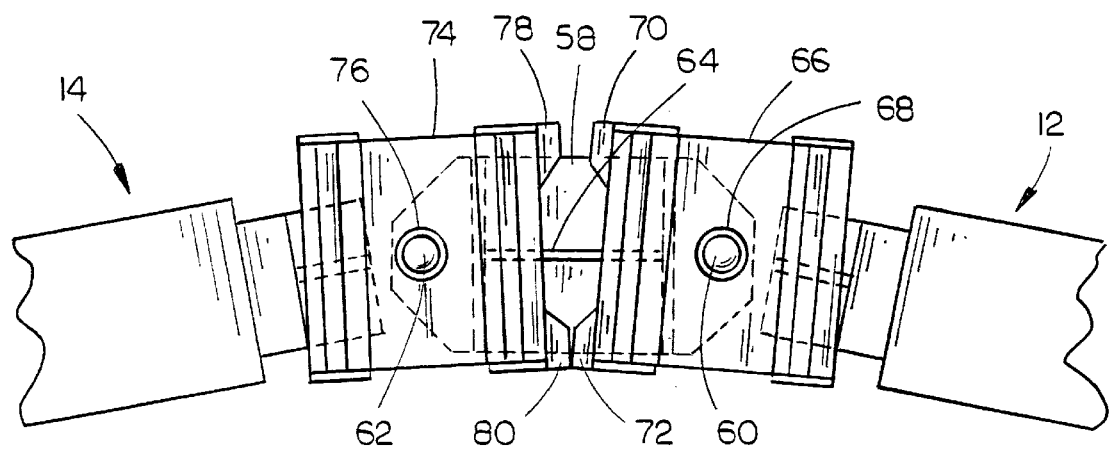
FIG. 7 is a partial rear elevational view of a means for limiting the flexing of the tool bar sections.
Figure 8:
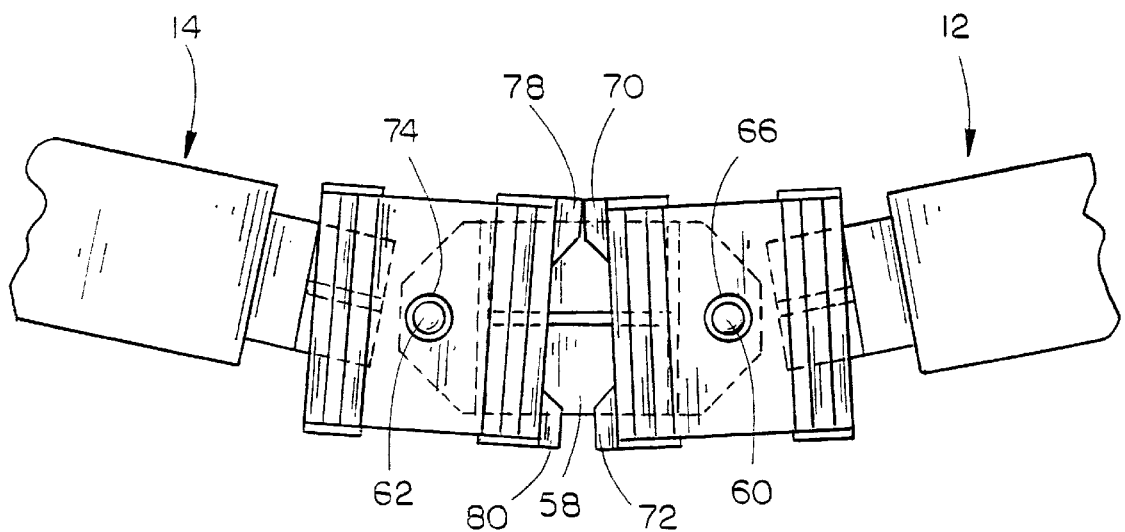
FIG. 8 is a view similar to FIG. 7 except that the tool bar sections are being flexed upwardly.

FIGS. 7 and 8 demonstrate the structure which is used when a pair of row units are to be mounted at the rear of the tongue 11 such as when the tool bar is to be a twenty-four-row unit spaced fifteen inches apart on a thirty-foot tool bar. Plate 58 is secured to the rearward end of the tongue 11 and has a pair of horizontally disposed and rearwardly extending pivot ends 60 and 62 positioned thereon. Plate 64 is generally H-shaped and also extends rearwardly from the plate 58. A first plate 66 has a central opening 68 formed therein which receives the pivot pin 60 to pivotally mount the plate 66 on the pivot pin 60. The inner end of the plate 66 has a pair of bumpers or stops 70 and 72 provided thereon. The outer end of the plate 66 is connected to the inner end of the tool bar section 12 by any convenient means. Similarly, a second pivot plate 74, having a central opening 76 formed therein, receives the pivot pin 62 to pivotally mount the plate 74 on the pivot pin 62. The inner end of the plate 74 has bumpers or stops 78 and 80 mounted thereon, as seen in FIGS. 7 and 8. The outer end of plate 74 is connected to the tool bar section 14 by any convenient means.

Thus, the embodiment illustrated in FIGS. 7 and 8 provides a mounting plate 66 for a row unit and a mounting plate 74 for a row unit. Such a structure enables the row units to be placed in an extremely or ultra-narrow row configuration such as fifteen inch rows, as stated above. The engagement of the bumpers 72 and 80, as illustrated in FIG. 7, limits the downward flex of the tool bar sections 12 and 14 with the engagement of the bumpers 70 and 78, as illustrated in FIG. 8, limiting the upward flexing of the tool bar sections 12 and 14. The structure shown in FIGS. 7 and 8 also provides the flex-row averaging system and it can be seen that each of the mounting plates 66 and 74 only move one-half of the angle between the tool bar sections 12 and 14, thereby ensuring that the gauge wheels of the planter units mounted on the brackets 66 and 74 will not come into contact when the tool bar sections 12 and 14 are flexed downwardly, as illustrated in FIG. 7, and ensures that the seed boxes on the planter units will not come into contact with one another when the tool bar sections 12 and 14 are flexed upwardly to the position of FIG. 8.

Thus it can be seen that a novel tool bar has been provided which provides the flex-row averaging system described herein to positively prevent interference between row unit depth gauge wheels, when crowning a terrace at a full twenty-four degrees of down-flex, and also prevents damage to seed boxes at a full twenty-four degrees of up-flex. The flex-row averaging structure of this invention keeps the tool bar hitch at an angle of tilt, halfway between the angle of tilt of the tool bar sections or wings.

It can therefore be seen that the invention accomplishes at least all of its stated objectives.

I claim:

1. A tool bar, comprising:

an elongated tongue having forward and rearward ends;

said tongue having a top wall, a bottom wall, and opposite side walls;

said forward end of said tongue having a hitch member provided thereon for connection to a prime mover;

said tongue being rotatably connected, about a horizontal axis parallel to the longitudinal axis of said tongue, to said hitch member;

a first horizontally disposed pivot pin secured to said tongue rearwardly of the forward end thereof closely adjacent one of said side walls;

a second horizontally disposed pivot pin secured to said tongue rearwardly of the forward end thereof closely adjacent the other of said side walls;

each of said first and second pivot pins having its longitudinal axis disposed parallel to the longitudinal axis of said tongue;

a first elongated tool bar section having inner and outer ends;

a second elongated tool bar section having inner and outer ends;

said tool bar sections extending transversely outwardly from opposite sides of said tongue when in a field working condition;

said inner ends of said first and second tool bar sections being pivotally secured to said first and second pivot pins, respectively, whereby said tool bar sections may pivotally move upwardly and downwardly with respect to said tongue;

and flex control means connected to said tongue and said first and second tool bar sections for positioning said tongue at an angle of tilt approximately halfway between the angle of tilt of the first and second tool bar sections with respect to each other.

2. The tool bar of claim 1 further comprising a vertically disposed plate being secured to the rearward end of said tongue; said plate having side portions which extend outwardly from said opposite side walls of said tongue; a first pivot end being secured to one of said side portions of said plate; a second pivot end being secured to the other of said side portions of said plate; and wherein first and second pivot plates are pivotally mounted on said first and second pivot ends, respectively, each of said first and second pivot plates serving as a row unit mounting plate adapted to have a row unit secured thereto.

3. The tool bar of claim 2 wherein said first and second pivot plates are vertically disposed and have inner ends; said inner ends of said first and second pivot plates being normally spaced-apart from one another; the engagement of said inner ends of said first and second pivot plates limiting the amount of relative pivotal movement between said first and second tool bar sections.

4. The tool bar of claim 1 including pivot limiting means for limiting the amount of pivotal movement between said first and second tool bar sections.

5. The tool bar of claim 1 wherein said flex control means comprises:

a vertically disposed shaft secured to said rearward end of said tongue which extends downwardly therefrom;

a collar vertically slidably mounted on said shaft;

a first link, having first and second ends, pivotally connected at its said first end to said collar and pivotally connected at its second end to said inner end of said first tool bar section;

and a second link, having first and second ends, pivotally connected at its said first end to said collar and pivotally connected at its said second link to said inner end of said second tool bar section.

6. The tool bar of claim 1 wherein a flex-stop means is secured to and extends between said inner ends of said first and second tool bar sections.

* * * * *